US011892535B2

(12) United States Patent
Sakamaki et al.

(10) Patent No.: US 11,892,535 B2
(45) Date of Patent: Feb. 6, 2024

(54) SIGNAL PROCESSING APPARATUS AND SIGNAL PROCESSING METHOD

(71) Applicant: Mitsubishi Electric Corporation, Tokyo (JP)

(72) Inventors: Hiroshi Sakamaki, Tokyo (JP); Ikuya Kakimoto, Tokyo (JP); Tomoya Matsuda, Tokyo (JP); Takamichi Nakamizo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 562 days.

(21) Appl. No.: 17/263,893

(22) PCT Filed: Jun. 14, 2019

(86) PCT No.: PCT/JP2019/023743
§ 371 (c)(1),
(2) Date: Jan. 28, 2021

(87) PCT Pub. No.: WO2020/031506
PCT Pub. Date: Feb. 13, 2020

(65) Prior Publication Data
US 2021/0231790 A1 Jul. 29, 2021

(30) Foreign Application Priority Data
Aug. 6, 2018 (JP) ................................ 2018-147534

(51) Int. Cl.
G01S 13/58 (2006.01)
G01S 7/292 (2006.01)
(Continued)

(52) U.S. Cl.
CPC ............ G01S 13/581 (2013.01); G01S 7/292 (2013.01); G01S 7/41 (2013.01); G01S 13/534 (2013.01); G01S 13/95 (2013.01)

(58) Field of Classification Search
CPC .......... G01S 13/581; G01S 7/292; G01S 7/41; G01S 13/534; G01S 13/95; G01S 13/958
See application file for complete search history.

(56) References Cited

U.S. PATENT DOCUMENTS 7,589,666 B2 * 9/2009 Passarelli, Jr. ...... G01S 13/5244
342/194
9,310,480 B2 * 4/2016 Sierwald ............... G01S 13/532
(Continued)

FOREIGN PATENT DOCUMENTS

JP 2013-205268 A 10/2013

OTHER PUBLICATIONS

International Search Report and Written Opinion dated Sep. 3, 2019, received for PCT Application PCT/JP2019/023743, Filed on Jun. 14, 2019, 10 pages including English Translation.
(Continued)

Primary Examiner — Peter M Bythrow
(74) Attorney, Agent, or Firm — XSENSUS LLP

(57) ABSTRACT

A signal processing apparatus that performs signal processing on a Doppler spectrum derived from a reception signal of a reflected wave of pulsed undulation repeatedly transmitted into a space removes a topographic echo spectrum from the Doppler spectrum and extracts a plurality of candidate points of a target echo spectrum from the Doppler spectrum from which the topographic echo spectrum has been removed. Furthermore, the signal processing apparatus determines positional relation between the candidate points and a plurality of removed points of the topographic echo spectrum removed from the Doppler spectrum and extracts as an interpolation point, a point where the target echo spectrum is missing by removal of the topographic echo
(Continued)

spectrum based on positional relation between the candidate points and the removed points in a direction of a frequency axis.

22 Claims, 11 Drawing Sheets

(51) Int. Cl.
*G01S 7/41* (2006.01)
*G01S 13/534* (2006.01)
*G01S 13/95* (2006.01)

(56) References Cited

U.S. PATENT DOCUMENTS

| | | | | |
|---|---|---|---|---|
| 9,835,721 | B2* | 12/2017 | Minowa | G01S 7/414 |
| 2008/0001808 | A1* | 1/2008 | Passarelli, Jr. | G01S 13/5244 |
| | | | | 342/26 R |
| 2009/0066563 | A1* | 3/2009 | Hannesen | G01S 7/414 |
| | | | | 342/26 D |
| 2010/0090884 | A1* | 4/2010 | Venkatachalam | G01S 13/5244 |
| | | | | 342/159 |
| 2014/0333475 | A1* | 11/2014 | Sierwald | G01S 13/95 |
| | | | | 342/26 R |

OTHER PUBLICATIONS

Masahito Ishihara, "Doppler Weather Radar", Kisho Kenkyuu Note No. 200, the Meteorological Society of Japan, Dec. 2001, pp. 30-31 (5 pages including English Translation).

Siggia, et al., "Gaussian Model Adaptive Processing (GMAP) for Improved Ground Clutter Cancellation and Moment Calculation", Proceedings of ERAD, Online Available at: URL:http://copernicus.org/erad/2004/online/ERAD04_P_67.pdf, 2004, pp. 67-73.

Notice of Reasons for Refusal dated Mar. 31, 2020, received for JP Application 2019-568113, 8 pages including English Translation.

Extended European search report dated Aug. 27, 2021, in corresponding European patent Application No. 19846660.9, 12 pages.

* cited by examiner (a)

(b)

(a)

(b)

(c)

PEAK (DOPPLER VELOCITY)
OF WEATHER ECHO SPECTRUM (a)

−Vn  +Vn

PEAK (DOPPLER VELOCITY)
OF WEATHER ECHO SPECTRUM
PEAK POWER (b)

REMOVED POINT

CANDIDATE POINT  CANDIDATE POINT

PEAK (DOPPLER VELOCITY)
OF WEATHER ECHO SPECTRUM
PEAK POWER

SIGNAL PROCESSING APPARATUS AND SIGNAL PROCESSING METHOD

CROSS-REFERENCE TO RELATED APPLICATIONS

The present application is based on PCT filing PCT/JP2019/023743, filed Jun. 14, 2019, which claims priority to JP 2018-147534, filed on Aug. 6, 2018, the entire contents of each are incorporated herein by reference.

TECHNICAL FIELD

The present disclosure relates to a signal processing apparatus and a signal processing method for processing a signal from an observation apparatus (a measurement apparatus) that uses undulation such as electromagnetic waves or sound waves for measuring a distance to and a velocity of a target or an object that is remotely located.

BACKGROUND ART

An observation apparatus (a measurement apparatus) using undulation such as electromagnetic waves or sound waves has conventionally been available as an apparatus that measures a distance to and a velocity of a target or an object that is remotely located. For such an observation apparatus (a measurement apparatus), a pulse Doppler technique using a radar apparatus, a lidar (lightwave radar) apparatus, or a sodar (sonic radar) apparatus has been known. According to some pulse Doppler techniques, an echo outside a basic sweep cycle (outside a distance measurement range) is used or removed. Though description will be given hereinafter with reference to a radar apparatus (in particular, a pulse Doppler radar apparatus) by way of example of the observation apparatus, application of the signal processing apparatus and the signal processing method according to the present application is not limited to application to the radar apparatus. The pulse Doppler technique is used also for an observation apparatus (a measurement apparatus) such as a weather radar apparatus directed to precipitation particles (raindrops). The weather radar apparatus measures a position, strength (electric power), a Doppler velocity, or a spectral width of an object by emitting pulsed electromagnetic waves into a space, receiving reflected waves scattered by weather particles (precipitation particles) that are targets in the space, and processing reception signals.

In an observation method (a measurement method) for measuring a distance to and a velocity of a target or an object that is remotely located with the use of an observation apparatus (a measurement apparatus) as such, transmission waves are subjected to pulse modulation and a distance is calculated based on a time lag between transmission and reception of pulses. By frequency-analysis of reception signals sampled with pulse recurrence periods, a Doppler frequency (a Doppler velocity) of a target can be calculated. The observation apparatus (measurement apparatus) can accurately measure a target by removing unnecessary waves.

For example, there is a demand on a weather radar apparatus for high-speed and high-density measurement in a three-dimensional space. When measurement is conducted at an angle of elevation close to a horizontal, however, a topographic echo is received more or less. When an angle of elevation is large to some extent as well, a side lobe may be captured in topography at a short distance. When a topographic echo is introduced, two peaks originating from topography and precipitation appear in a Doppler spectrum. The topographic echo not only shifts a Doppler velocity of precipitation (a weather echo) apparently in a zero direction but also generally has protruding electric power and hence it also causes overassessment of strength (electric power), that is, rainfall strength. Therefore, the topographic echo should be removed. Processing for removing a topographic echo is generally called moving target indicator (MTI).

Since a signal of a topographic echo is concentrated in a low frequency region where a Doppler velocity is around 0, an approach (see, for example, NPL 1) to removal using a low-pass filter for a time-series phase difference signal or an approach (see, for example, NPL 1) to recovery of a weather echo around a Doppler velocity of 0 suppressed together with a topographic echo by removing a section around the Doppler velocity of 0 on a Doppler spectrum and interpolating the removed section with signals around the same are available.

An approach (see, for example, PTL 1) using Gaussian distribution application (which is called Gaussian fitting hereafter) by using the fact that a topographic echo and a weather echo are both in a shape of a Gaussian distribution on a Doppler spectrum is available as an approach to removal of the topographic echo and reconstruction of the weather echo.

CITATION LIST

Patent Literature

PTL 1: U.S. Pat. No. 7,589,666

Non Patent Literature

NPL 1: Masahito Ishihara, Doppler Weather Radar, Kisho Kenkyuu Note No. 200, the Meteorological Society of Japan, pp. 30-31, 2001.

SUMMARY OF INVENTION

Technical Problem

The method disclosed in PTL 1, however, is disadvantageous in that, because a Gaussian shape on which a topographic echo or a weather echo is based is generally defined by three parameters of an amplitude, an average, and a variance (standard deviation), Gaussian fitting aiming at optimization (minimization of a least square error) while adjusting the three parameters is large in amount of calculation and long in time period for calculation. Thus, in removal of a topographic echo by using a distribution function from a spectrum of a target echo (a weather echo) and a spectrum of the topographic echo that are in a shape of the same distribution function of Doppler spectra derived from reception signals, a smaller amount of calculation (a shorter time period for calculation) is more advantageous.

The present disclosure was made to solve a problem as above, and relates to a signal processing apparatus and a signal processing method allowing extraction in a short period of time, of an interpolation point for reconstitution of a target echo (weather echo) by narrowing a space searched for a parameter.

Solution to Problem

A signal processing apparatus and a signal processing method according to the present disclosure is characterized by removing a topographic echo spectrum from a Doppler spectrum derived from a reception signal of a reflected wave of pulsed undulation repeatedly transmitted into a space, extracting a plurality of candidate points of a target echo spectrum from the Doppler spectrum from which the topographic echo spectrum has been removed, determining positional relation between the candidate points and a plurality of removed points of the topographic echo spectrum removed from the Doppler spectrum, and extracting as an interpolation point, a point where the target echo spectrum is missing by removal of the topographic echo spectrum based on the positional relation between the candidate points and the removed points in a direction of a frequency axis.

Advantageous Effects of Invention

As set forth above, according to the present disclosure a signal processing apparatus and a signal processing method that allow extraction of an interpolation point for reconstructing a target echo based on positional relation between removed points of a spectrum of a topographic echo and candidate points of a spectrum of the target echo can be obtained.

DESCRIPTION OF EMBODIMENTS

The present application relates to a signal processing apparatus that performs signal processing on a Doppler spectrum derived from a reception signal of a reflected wave of pulse undulation repeatedly transmitted into a space, and a signal processing method of performing signal processing on a Doppler spectrum derived from a reception signal of a reflected wave of pulsed undulation repeatedly transmitted into a space and resulting from removal of a topographic echo from a target echo spectrum and a topographic echo spectrum that are in a shape of an identical distribution function by using the distribution function. In an embodiment, an example where an observation apparatus (a measurement apparatus) to which the signal processing apparatus and the signal processing method are applied is a weather radar apparatus will be described by way of example. Therefore, a weather echo is handled as a target echo. An example in which a Gaussian function is adopted as the distribution function will be described by way of example. Namely, the present application is available also for reconstruction of a weather echo, and application thereof to removal of a topographic echo by Gaussian fitting on a spectrum adopted also in many topographic echo removal approaches is preferred.

First Embodiment

Figure 1:
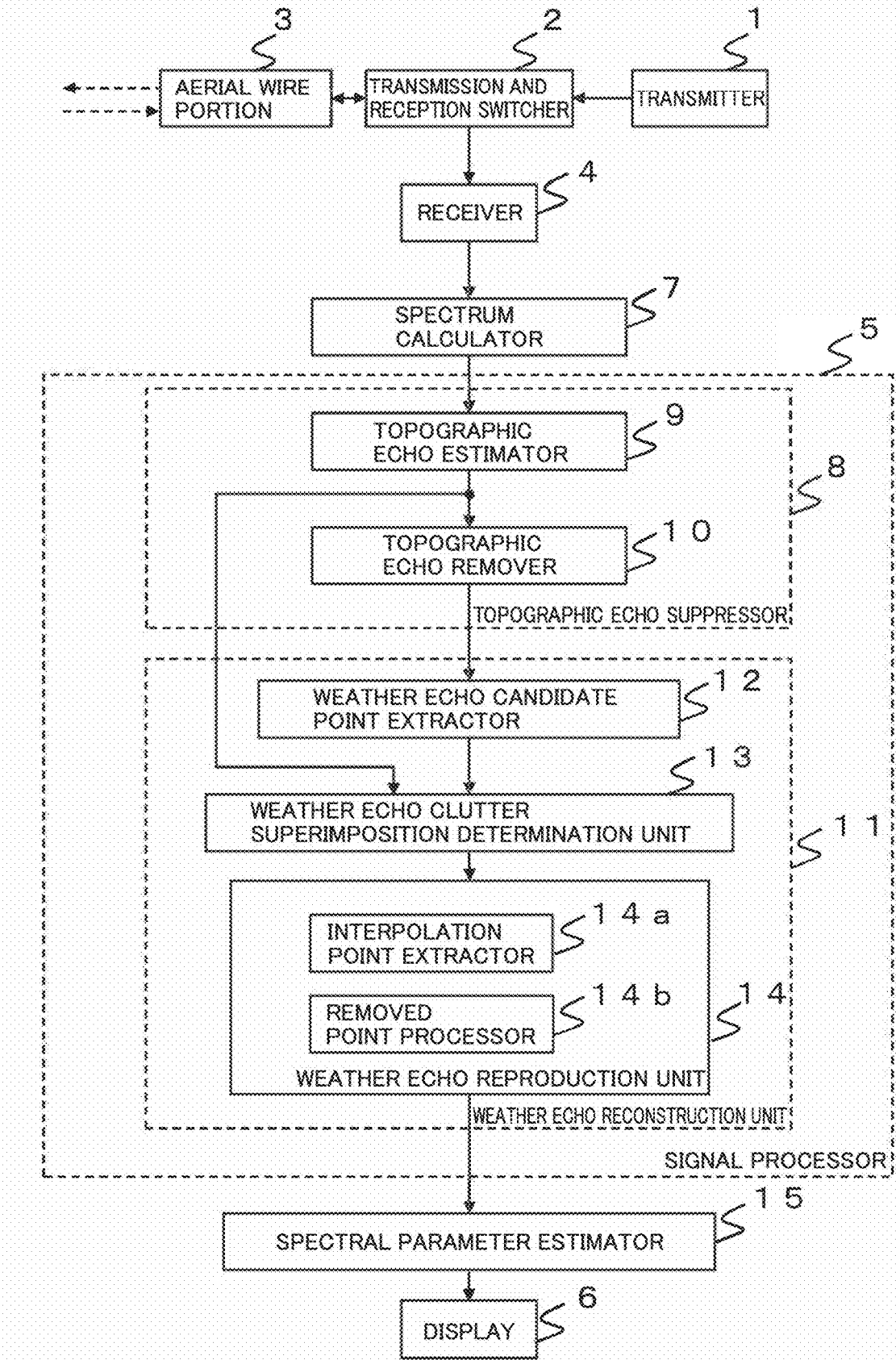
FIG. 1 is a functional block diagram of a weather radar apparatus to which a signal processing apparatus according to first and second embodiments of the present disclosure is applied.

A signal processing apparatus and a signal processing method according to a first embodiment of the present disclosure will be described below with reference to FIGS. 1 to 11. In particular, the signal processing method according to the first embodiment will be described with reference to FIGS. 2 and 3. FIG. 1 is a functional block diagram of a weather radar apparatus (an observation apparatus or a measurement apparatus) to which the signal processing apparatus according to the first embodiment is applied. The present application can be carried out also according to a configuration of a functional block different from that in FIG. 1. In other words, the configuration shown in FIG. 1 is an exemplary block configuration. The same or corresponding elements in the drawings of the present application have the same reference characters allotted and detailed description thereof may not be provided.

In FIG. 1, a weather radar apparatus to which the signal processing apparatus according to the first embodiment is applied includes a transmitter 1, a transmission and reception switcher 2, an aerial wire portion 3 (an antenna portion 3), a receiver 4, and a signal processor 5 (signal processor 5 corresponding to the signal processing apparatus according to the present application). These can be defined as the weather radar apparatus according to the first embodiment. In other words, the observation apparatus (measurement apparatus) according to the first embodiment can be defined as including transmitter 1, transmission and reception switcher 2, aerial wire portion 3 (antenna portion 3) or an optical scanner 3 or a sound wave speaker 3, receiver 4, and signal processor 5 (the signal processing apparatus according to the present application). Aerial wire portion 3 (antenna portion 3) or optical scanner 3 or sound wave speaker 3 can be defined as an undulation emitter and accepter 3. Such undulation emitter and accepter 3 may be constituted of a transmitter and a receiver separate from each other.

In FIG. 1, transmitter 1 generates a reference signal on which transmission waves are based and subjects the reference signal to pulse modulation, such phase modulation as varying an initial phase each time of transmission, frequency conversion, or amplification. Transmission and reception switcher 2 outputs pulsed undulation which is transmission waves generated in transmitter 1 to aerial wire portion 3 and takes in reception waves from aerial wire portion 3. Aerial wire portion 3 radiates pulsed undulation as transmission waves into a space and obtains as reception waves (reflected waves), incoming radio waves (reflected undulation) as a result of reflection by an object present in the space. Receiver 4 takes in reception waves received at aerial wire portion 3 and passing through transmission and reception switcher 2 and subjects the reception waves to frequency conversion and amplification. Thereafter, receiver 4 demodulates the reception waves, generates a reception signal (a reception signal of a reflected wave of pulsed undulation), and sends the reception signal to signal processor 5.

In FIG. 1, signal processing apparatus 5 is the signal processing apparatus according to the first embodiment. Signal processing apparatus 5 includes a spectrum calculator 7, a topographic echo suppressor 8, a weather echo reconstruction unit 11 (a target echo reconstruction unit 11), and a spectral parameter estimator 15 (a target echo reconstruction unit 15). At least one of spectrum calculator 7 and spectral parameter estimator 15 (target echo reconstruction unit 15) may be provided outside signal processing apparatus 5. FIG. 1 illustrates an example where both of spectrum calculator 7 and spectral parameter estimator 15 are provided outside a portion of signal processing apparatus 5 delimited by a dotted line. Signal processing apparatus 5 sends to the outside, at least one of a weather echo candidate point (which is called a candidate point), a topographic echo point (which is called a removed point), an interpolation point, and a reconstructed spectrum of the target echo which will be described later. Display 6 is a display apparatus such as a liquid crystal display that shows a candidate point, a removed point, an interpolation point, and a reconstructed target echo provided from signal processing apparatus 5. Display 6 may show a spectral parameter provided from signal processor 5 (spectral parameter estimator 15) which will be described later with a predetermined method.

In FIG. 1, spectrum calculator 7 generates a Doppler spectrum by Fourier transform of a reception signal generated in receiver 4. Topographic echo suppressor 8 includes a topographic echo estimator 9 and a topographic echo remover 10. Topographic echo estimator 9 estimates a topographic echo from a Doppler spectrum derived from a reception signal of a reflected wave of reflected pulsed undulation. Topographic echo estimator 9 preferably estimates a spectral distribution of a topographic echo by fitting of a Doppler spectrum generated by spectrum calculator 7. Topographic echo remover 10 removes a point in the Doppler spectrum included in the spectral distribution of the topographic echo estimated by topographic echo estimator 9.

In FIG. 1, weather echo reconstruction unit 11 (target echo reconstruction unit 11) includes a weather echo candidate point extractor 12 (a candidate point extractor 12), a weather echo clutter superimposition determination unit 13 (a determination unit 13), and a weather echo reproduction unit 14 (a target echo reproduction unit 14). Weather echo candidate point extractor 12 (candidate point extractor 12) extracts a plurality of candidate points of a weather echo from a Doppler spectrum. Weather echo candidate point extractor 12 preferably receives as input, a Doppler spectrum from which the topographic echo has been removed and which is provided from topographic echo suppressor 8 (topographic echo remover 10) and extracts a spectral point equal to or higher than a predetermined noise level as a candidate point of the weather echo.

In FIG. 1, weather echo clutter superimposition determination unit 13 (determination unit 13) determines positional relation between a plurality of candidate points and a plurality of removed points of a spectrum of the topographic echo estimated by topographic echo estimator 9 and removed from the Doppler spectrum. Weather echo clutter superimposition determination unit 13 determines positional relation preferably by receiving as input, removed points estimated by topographic echo estimator 9 and candidate points extracted by weather echo candidate point extractor 12 and determining whether or not they are superimposed on or adjacent to each other.

In FIG. 1, when a weather echo (a spectrum) should be reproduced based on weather echo clutter positional information (positional information of removed points) provided from weather echo clutter superimposition determination unit 13, weather echo reproduction unit 14 reproduces a weather echo spectrum by fitting using the candidate points. When the weather echo spectrum does not have to be reproduced, the removed points are substituted with 0 or a value of a predetermined noise level. Weather echo reproduction unit 14 (target echo reproduction unit 14) includes an interpolation point extractor 14a and a removed point processor 14b. Interpolation point extractor 14a extracts as an interpolation point, a point where a spectrum of a weather echo is missing by removal of a topographic echo spectrum based on positional relation between the removed points and the candidate points. When candidate point extractor 12 determines that there is no candidate point, removed point processor 14b substitutes the level of the removed points with zero or a noise level of the Doppler spectrum. An apparatus that performs only operations up to extraction of an interpolation point by interpolation point extractor 14a is also encompassed in the signal processing apparatus according to the first embodiment.

In FIG. 1, spectral parameter estimator 15 (target echo reconstruction unit 15) detects a weather echo spectrum from a Doppler spectrum provided from weather echo reconstruction unit 11 (weather echo reproduction unit 14) and calculates by estimation, strength (electric power), a Doppler velocity, and a spectral width which are spectral parameters thereof. In other words, spectral parameter estimator 15 reconstructs a spectrum of a weather echo (target echo) at a position of the interpolation point. Specifically, spectral parameter estimator 15 reconstructs an interpolation point suppressed by a topographic echo based on positional relation between the candidate points and the removed points.

Figure 2:
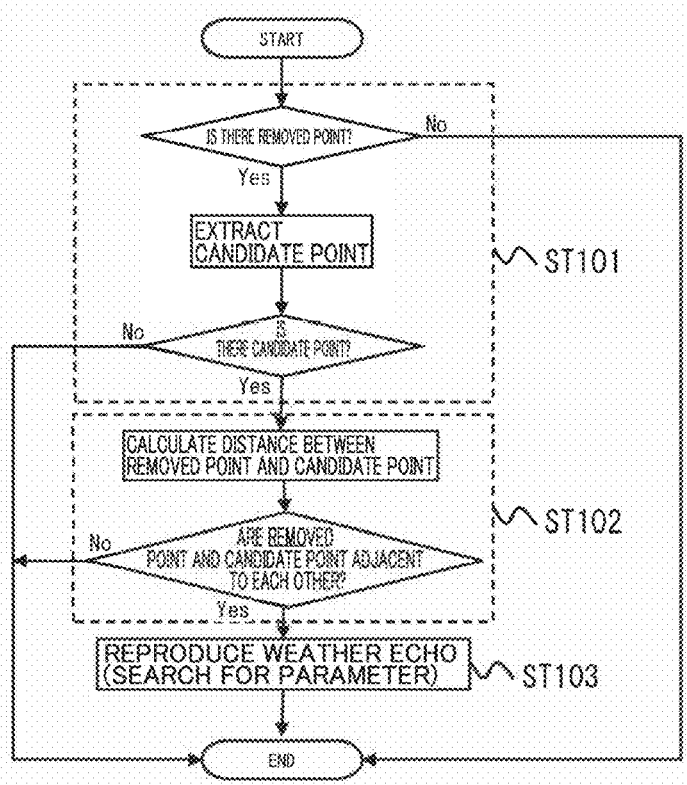
FIG. 2 is a flowchart of a signal processing method according to the first embodiment of the present disclosure.
Figure 2:
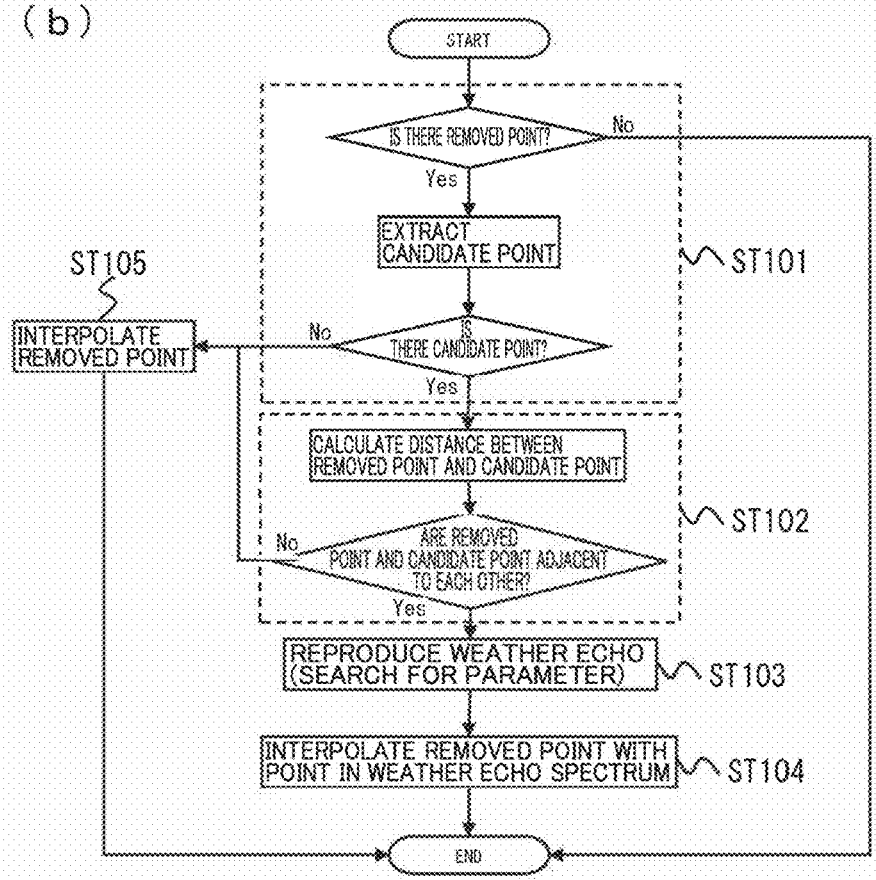

Steps (processing, a process step, ST) in the signal processing method according to the first embodiment will be described with reference to FIG. 2. The signal processing method according to the first embodiment relates to processing by the signal processing apparatus (signal processor 5) according to the first embodiment. FIG. 2 (*b*) shows steps in the signal processing method according to the first embodiment in which processing by spectral parameter estimator 15 and removed point processor 14b is also added as steps (ST103 and ST103). The same or corresponding elements in the drawings of the present application have the same reference characters allotted and detailed description thereof may not be provided.

In FIG. 2 (a), a candidate point extraction step (ST101) is a step of extracting a plurality of candidate points of a weather echo spectrum from a Doppler spectrum derived from a reception signal of a reflected wave of pulsed undulation repeatedly transmitted into a space and resulting from removal of a topographic echo spectrum from the weather echo spectrum and the topographic echo spectrum which are in a shape of the same distribution function, by using the distribution function. Since the candidate points are extracted from the removed points, when there is no removed point, the process ends. When there is no removed point, the weather echo is not suppressed by the topographic echo and hence reconstruction is not necessary. When there is no candidate point in spite of presence of the removed point, the process ends. When there is no candidate point, the weather echo is not suppressed by the topographic echo in spite of presence of the topographic echo and hence reconstruction is not necessary.

In FIG. 2 (a), a positional relation determination step (ST102) is a step of determining positional relation between a plurality of candidate points and a plurality of removed points of the topographic echo spectrum removed from the Doppler spectrum. When the removed points and the candidate points are not adjacent to each other, the process ends. Since the weather echo is not suppressed by the topographic echo in spite of presence of the topographic echo, reconstruction is not necessary. An interpolation point extraction step (ST103) is a step of extracting as an interpolation point, a point where a spectrum of a weather echo is missing by removal of the topographic echo spectrum based on positional relation between the removed points and the candidate points.

In FIG. 2 (b), the interpolation point reconstruction step (ST103) is a step of reconstructing a target echo spectrum at a position of the interpolation point. A removed point processing step (ST104) is a step of substituting a level of the removed points with zero or a noise level of the Doppler spectrum when there is no candidate point. The removed point processing step (ST104) is a step of substituting a level of the removed points in a portion other than the reconstructed target echo spectrum or a portion other than the target echo spectrum to be reconstructed with zero or a noise level of the Doppler spectrum.

A suitable configuration of the signal processing apparatus and the signal processing method according to the first embodiment will now be described with reference to the flowchart in FIG. 3. Specifically, a suitable operation by topographic echo suppressor 8 and weather echo reconstruction unit 11 within signal processor 5 which is a principal part of the signal processing apparatus according to the first embodiment will be described. FIGS. 4 to 11 supplement detailed processing by topographic echo suppressor 8 and weather echo reconstruction unit 11. In FIGS. 4 to 11, the abscissa represents a direction of a frequency axis (a frequency direction, a Doppler direction, or a velocity direction) of a Doppler spectrum and the ordinate represents a direction of a power axis (a direction of electric power) of a Doppler spectrum.

Principles of topographic echo suppressor 8 and weather echo reconstruction unit 11 shown in FIG. 1 are based on an assumption that a topographic echo spectrum and a weather echo spectrum each have a Gaussian spectral shape and a spectrum of a reception signal provided from spectrum calculator 7 can be expressed as in an expression (1).

$$S(v) = s_c \exp\left(-\frac{v^2}{2\sigma_c^2}\right) + s_w \exp\left(-\frac{(v-v_w)^2}{2\sigma_w^2}\right) + \eta \quad (1)$$

In the expression (1), S(v) represents the entire spectrum of a reception signal, the first term in the expression (1) represents a topographic echo component, $S_C$ represents topographic echo (peak) electric power, $\sigma_C$ represent a topographic echo spectral width, the second term in the expression (1) represents a weather echo component, $S_W$ represents weather echo (peak) electric power, $v_W$ represents a weather echo (average) Doppler velocity (not shown for the topographic echo because an average Doppler velocity thereof is around 0), $\sigma_W$ represents a weather echo spectral width, and the third term η in the expression (1) represents noise electric power (component).

Figure 4:
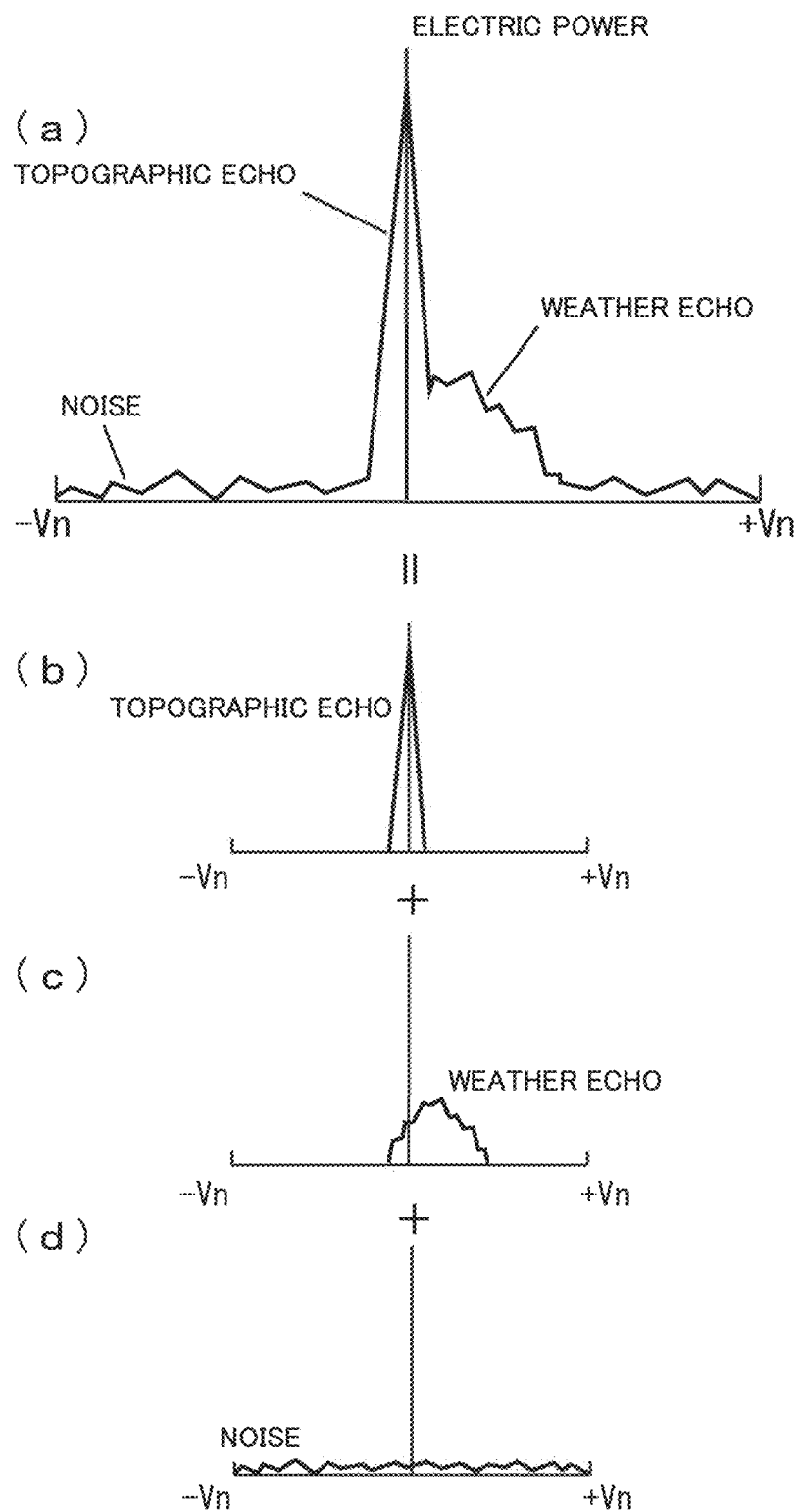
FIG. 4 is a schematic diagram showing a configuration of a Doppler spectrum of a reception signal in the signal processing apparatus and the signal processing method according to the first embodiment of the present disclosure.
Figure 5:
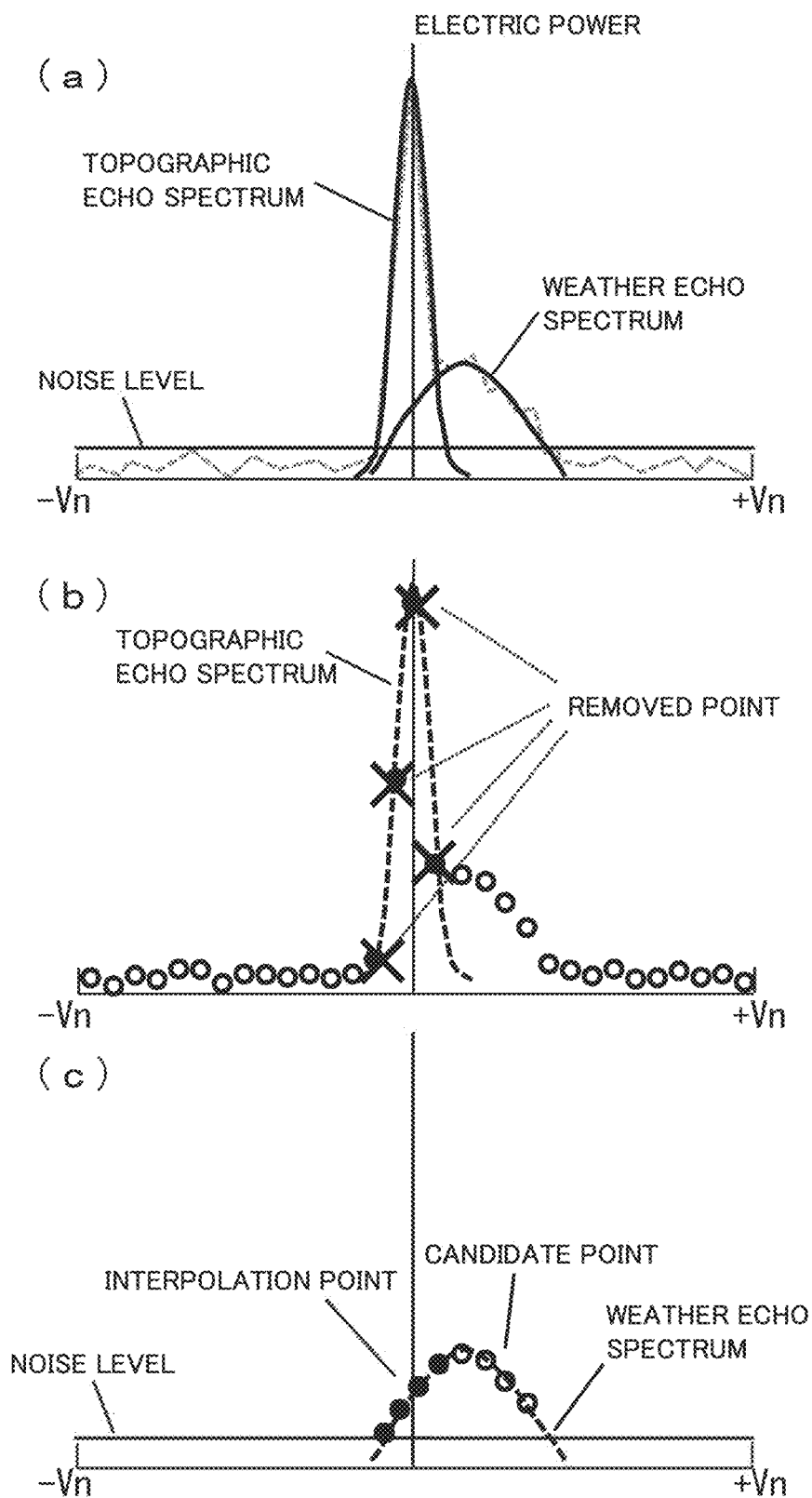
FIG. 5 is a schematic diagram illustrating removal of a topographic echo and reconstruction of a target echo (weather echo) in the signal processing apparatus and the signal processing method according to the first embodiment of the present disclosure.

FIG. 4 schematically shows a spectrum of a reception signal. FIG. 4 (a) shows the entire spectrum, FIG. 4 (b) shows a topographic echo component, FIG. 4 (c) shows a weather echo component, and FIG. 4 (d) shows a noise component. Vn represents a Nyquist velocity. FIG. 5 shows modeling of a topographic echo and a weather echo with a Gaussian spectrum and shows a process for estimating and removing (suppressing) a topographic echo and estimating and reproducing (reconstructing) a weather echo.

FIG. 5 (a) corresponds to FIG. 4 (a) and shows the entire spectrum. At this time, a topographic echo spectrum and a weather echo spectrum are modeled to Gaussian spectra shown with a bold solid line as in the figure, and a noise level is also constant as shown with the bold solid line in the figure. FIG. 5 (b) shows a state that a spectral point included in the topographic echo spectrum (a dashed line in the figure) has been removed and a removed point is labeled with "x" as shown in the figure. FIG. 5 (c) shows a state that point (candidate points) equal to or higher than a noise level are extracted, a weather echo spectrum is set in accordance with the candidate points, and spectral points at positions of the removed points are newly interpolated. In the figure, a white circle represents a candidate point of a weather echo spectrum and a black circle represents an interpolation point.

Figure 3:
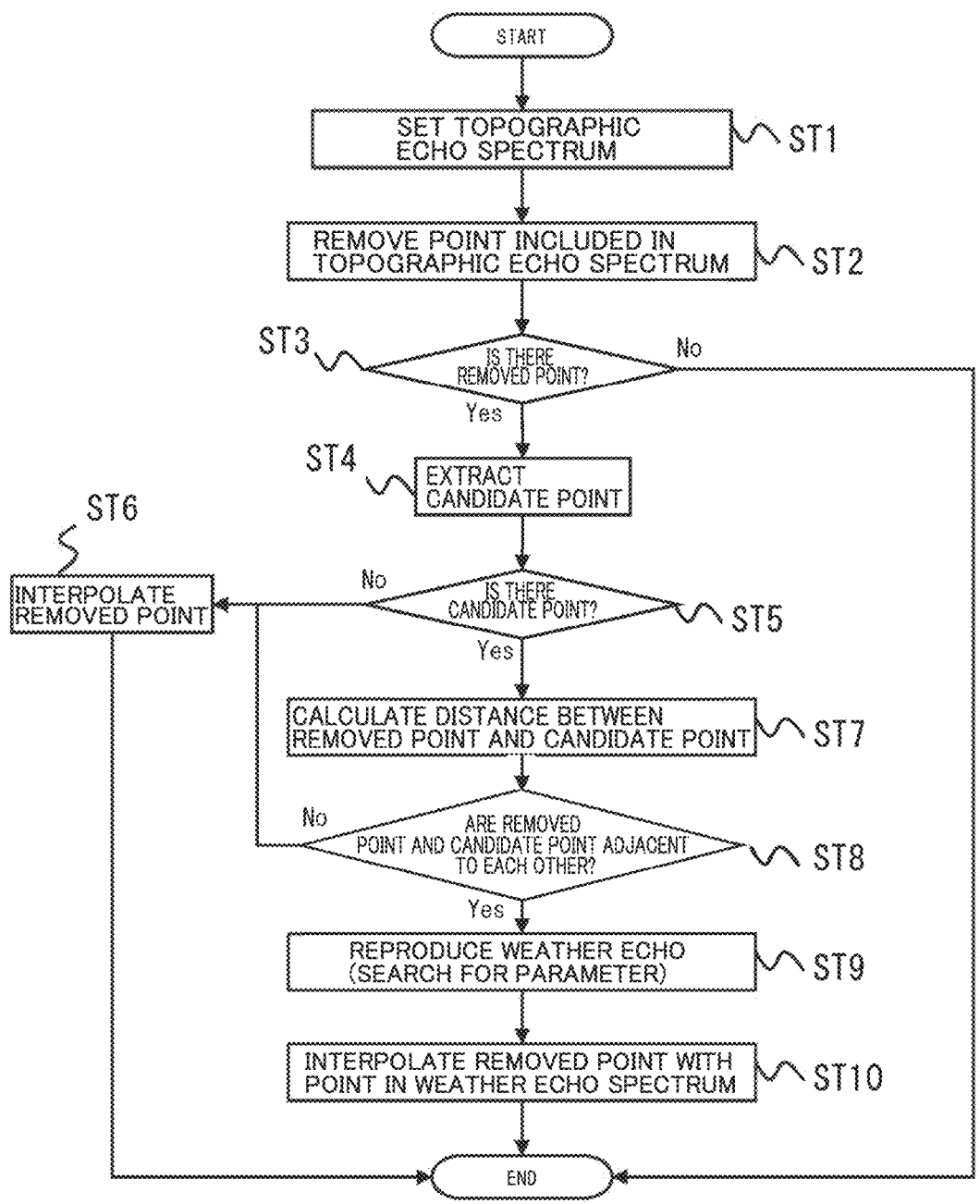
FIG. 3 is a flowchart of the signal processing method according to the first embodiment of the present disclosure.

In the flowchart in FIG. 3, initially, a topographic echo spectrum is set for a(n entire) spectrum (ST1). The topographic echo is reflection from the ground or mountains, and is less likely to greatly be varied by an environmental condition. Therefore, spectral width $\sigma_C$ can be set to a predetermined fixed value. An unknown parameter in the topographic echo spectrum is only peak power $S_C$, and this value can be a value at a point of a Doppler velocity of 0 of an original spectrum or an average value of several points in the vicinity of the Doppler velocity of 0. As set forth above, a topographic echo spectrum can be set without fitting (search).

Then, the spectral points included in the topographic echo spectrum set in ST1 are removed (ST2, FIG. 5 (b)). Whether or not there is a removed point is checked (ST3), and when no spectral point, that is, no removed point, is included in the topographic echo spectrum, it means that there is no topographic echo and the process ends without suppression of the topographic echo and reconstruction of the weather echo. In ST3, when there is a removed point, a weather echo candidate point is then extracted (ST4). This candidate point is a point where electric power is higher than a predetermined noise level. Whether or not there is a candidate point is checked (ST5). ST3, ST4, and ST5 correspond to ST101 shown in FIG. 2.

When there is no candidate point in processing in ST5, it means that there is no weather echo, that is, the removed point does not have to be interpolated with a weather echo spectrum, and the removed point is interpolated with a point at the noise level or zero (ST6). ST6 corresponds to ST105 shown in FIG. 2. When it is determined in the candidate point extraction step (ST101) by weather echo candidate point extractor 12 that there is no candidate point, the level of the removed point is substituted with zero or the noise level of the Doppler spectrum. When candidate points appear sparsely (discontinuously) in the frequency (velocity) direction or a large number of candidate points appear, it means that the set noise level is low and hence the noise level is adjusted (raised). When candidate points are non-adjacent on the frequency axis judging with continuity set, in advance, on the frequency axis (the frequency direction, the Doppler direction, or the velocity direction) or when there are candidate points more than a number set in advance in the candidate point extraction step (ST101) by weather echo candidate point extractor 12, candidate points are extracted with the noise level of the Doppler spectrum being raised.

In order to check whether or not candidate points appear sparsely (discontinuously), for example, maximum and minimum points of the candidate points on the frequency (velocity) axis (the abscissa in the drawings) are extracted. When the number of sample points of a spectrum in a section between the maximum and the minimum is compared with the number of candidate points that appear and they are substantially equal to each other, the candidate points can be determined as being continuous, and when the number of sample points is larger by two times or more, the candidate points can be determined as being discontinuous. Whether or not a large number of candidate points appear can be determined by providing a threshold value for the number of candidate points and comparing the number with the threshold value. When a manner of appearance of candidate points does not vary as a result of adjustment of the noise level, it is determined that variation in noise is great or a spectrum itself is abnormal, and the process proceeds to ST6. When a manner of appearance of candidate points does not vary based on comparison between after and before increase in noise level of the Doppler spectrum in the candidate point extraction step (ST101) by weather echo candidate point extractor 12, it is determined that there is no candidate point and the process proceeds to ST6.

Figure 6:
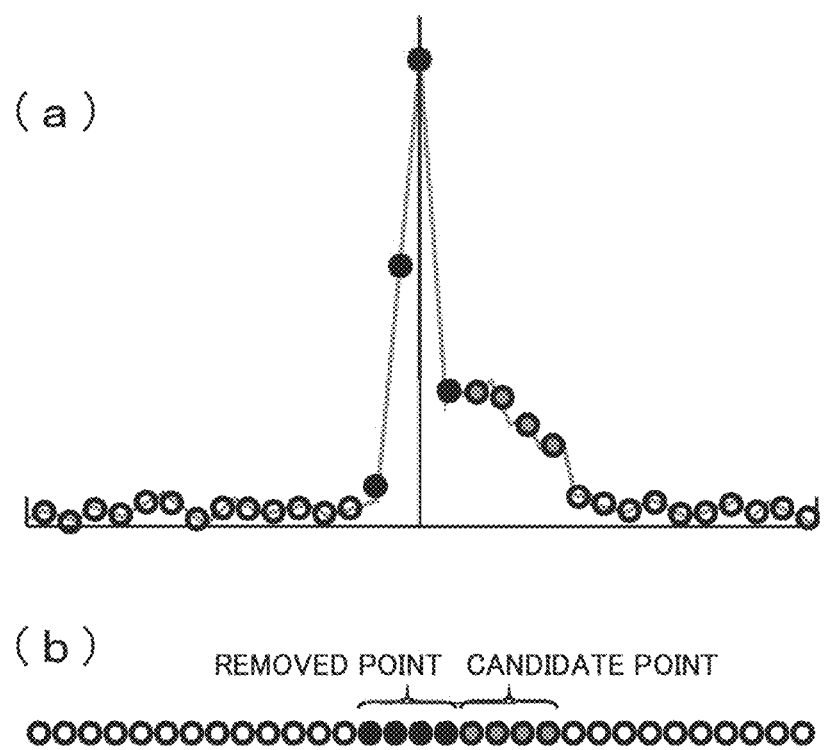
FIG. 6 is a schematic diagram showing relation between a topographic echo removed point and a target echo (weather echo) candidate point in the signal processing apparatus and the signal processing method according to the first embodiment of the present disclosure.
Figure 8:
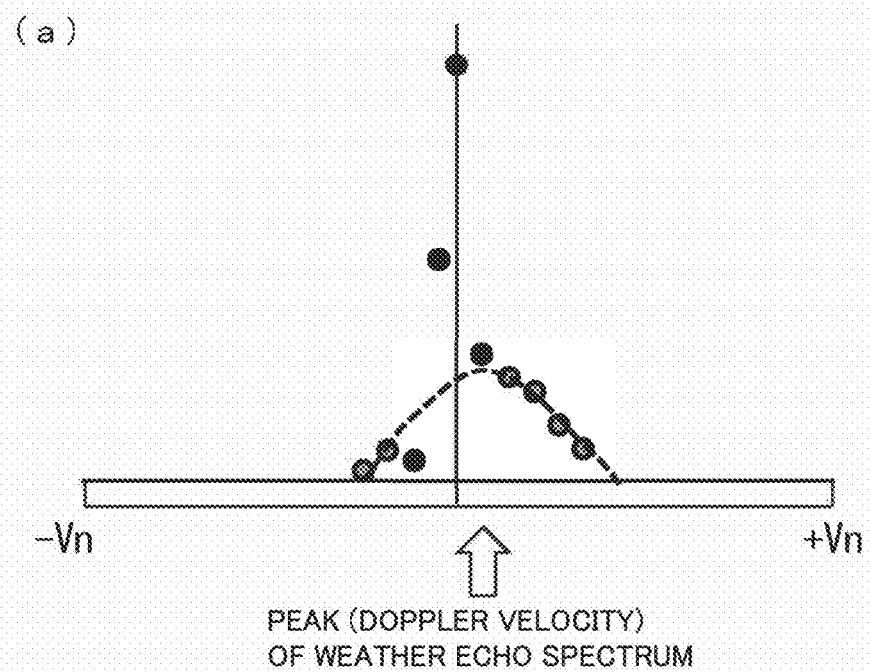
FIG. 8 is a schematic diagram showing relation between a topographic echo removed point and a target echo (weather echo) candidate point in the signal processing apparatus and the signal processing method according to the first embodiment of the present disclosure.
Figure 8:
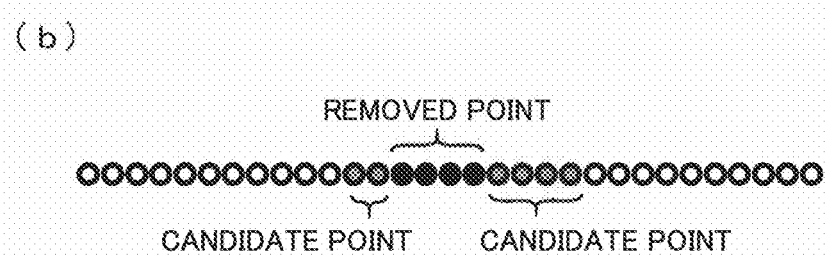

In ST5, when there is a candidate point, a distance on the frequency (velocity) axis between the removed points and the candidate points is calculated (ST7). FIG. 6 (*a*) shows the entire spectrum and FIG. 6 (*b*) shows positional relation between the removed points and the candidate points on the frequency (velocity) axis. In the example in FIG. 6 (*b*), the removed points and the candidate points are adjacent to each other and the distance is 1 (a sample point). A distance between the removed points and the candidate points can be calculated, for example, by adopting a shorter one of a distance between a maximum point in a group of removed points and a minimum point in a group of candidate points and a distance between a minimum point in the group of removed points and a maximum point in the group of the candidate points. The candidate points may widely be distributed as containing removed points as shown in FIG. 8. In this case, extraction can be based on a condition that the maximum point of the candidate points is larger than the maximum point of the removed points and the minimum point of the candidate points is smaller than the minimum point of the removed points. A pitch between candidate points and between removed points (sample points) or a pitch between extracted interpolation points is predetermined. An example in which a series of candidate points and a series of removed points are adjacent to each other at this pitch or an example in which a candidate point and a removed point are adjacent to each other is referred to as a series of candidate points and a series of the removed points being continuous or a candidate point and a removed point being continuous.

Then, adjacency (continuity) is determined based on a distance (positional relation) between a removed point and a candidate point (ST8). ST7 and ST8 correspond to ST102 shown in FIG. 2. When the removed point and the candidate point are not adjacent to each other, it is expected that a weather echo spectrum is not superimposed on the removed point, that is, fitting of the weather echo spectrum is not necessary (FIG. 7 (*a*) and (*b*)). Therefore, the removed point is interpolated with the noise level (ST6) and the process ends. When a range of values of candidate points contains a range of values of removed points as well, the removed points and the candidate points are determined as being adjacent to each other. In other words, in the candidate point extraction step (ST101) by weather echo candidate point extractor 12, positional relation is determined based on an interval of a length set in advance in the direction of the frequency axis, and whether or not the removed points and the candidate points are continuous is determined. Then, in the candidate point extraction step (ST101) by weather echo candidate point extractor 12, when the removed points and the candidate points are not continuous, it is determined that there is no candidate point.

Figure 7:
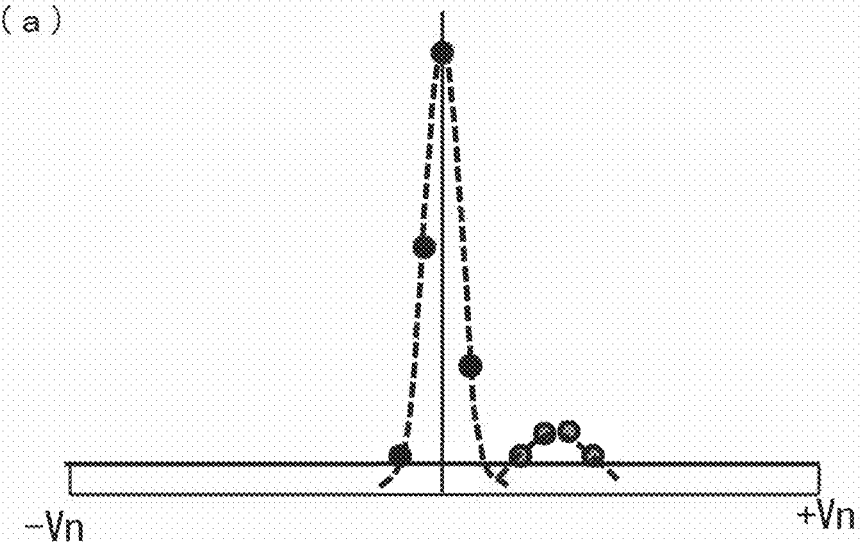
FIG. 7 is a schematic diagram showing relation between a topographic echo removed point and a target echo (weather echo) candidate point in the signal processing apparatus and the signal processing method according to the first embodiment of the present disclosure.
Figure 7:
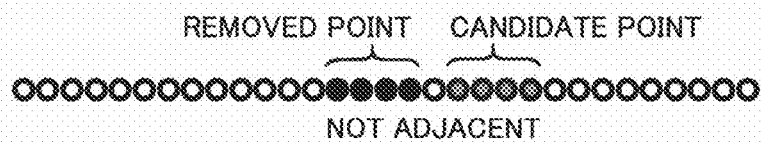
Figure 7:
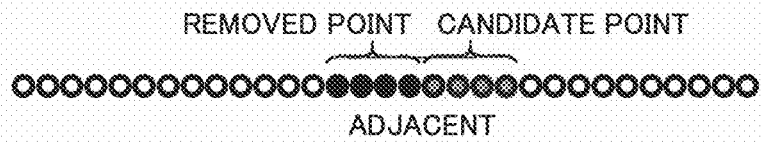

When the removed points and the candidate points are adjacent to each other (FIG. 7 (*c*)) in ST8, an interpolation point can be extracted. Therefore, the weather echo spectrum is reproduced based on the interpolation point, that is, parameter search by fitting is carried out (ST9). ST9 corresponds to ST103 shown in FIG. 2. A type of a parameter to be searched for or a search method can be modified depending on positional relation between the removed points and the candidate points. FIG. 8 shows such positional relation that a range of values of candidate points contains a range of values of removed points. In this case, unknown parameter $v_W$ of a weather echo parameter may be located in the center of the candidate points and a range searched for $v_W$ can be set, for example, to a range of a midpoint in the group of candidate points±1 velocity bin. A hollow arrow shown in FIG. 8 (*a*) indicates a position where the center of the candidate points corresponds to a peak (Doppler velocity) of the weather echo spectrum.

Figure 9:
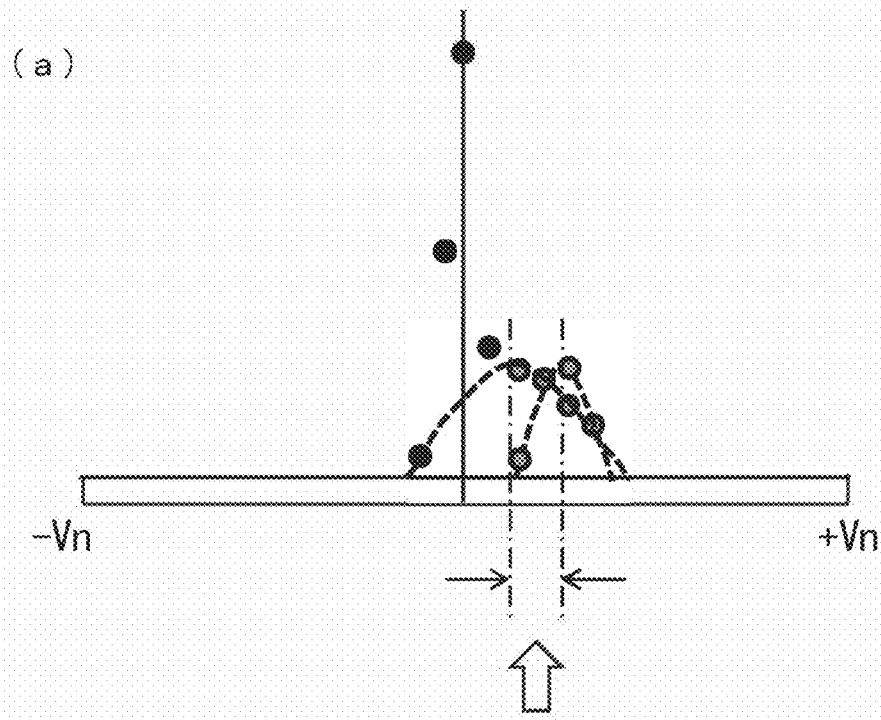
FIG. 9 is a schematic diagram showing relation between a topographic echo removed point and a target echo (weather echo) candidate point in the signal processing apparatus and the signal processing method according to the first embodiment of the present disclosure.
Figure 9:
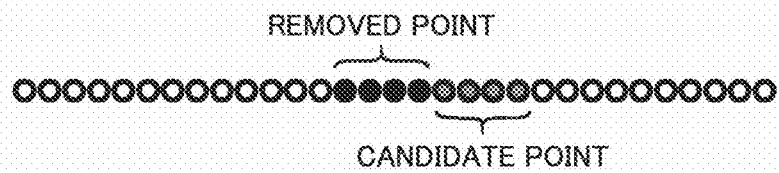

FIG. 9 shows an example in which candidate points are present only on one of a higher side and a lower side of removed points. In this case, a range where an unknown parameter of a weather echo spectrum is present may extend from the center of combination of removed points and candidate points to the center in a range of values of candidate points, and this range is searched for a parameter.

Figure 10:
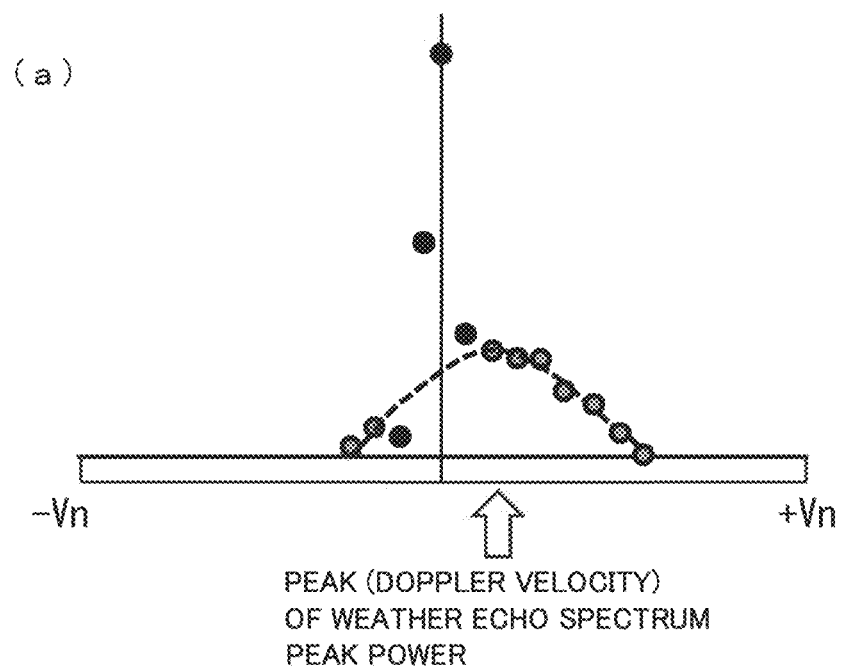
FIG. 10 is a schematic diagram showing relation between a topographic echo removed point and a target echo (weather echo) candidate point in the signal processing apparatus and the signal processing method according to the first embodiment of the present disclosure.
Figure 10:
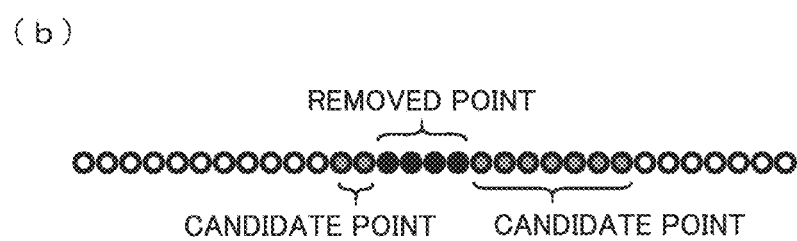

FIG. 10 shows an example in which a range of values of candidate points contains a range of values of removed points as in FIG. 8, and in particular, the center of sample points consisting of combination of removed points and candidate points is located within the group of candidate points. In this case, unknown parameter $v_W$ of a weather echo spectrum may be located in the center of sample points consisting of combination of removed points and candidate points and $S_W$ can also be considered as a value of that spectral point. Therefore, a range searched for $v_W$ can be set, for example, to a range from a midpoint in the group of candidate points±1 velocity bin and $S_W$ can be set to that spectral point or an average value of adjacent spectral points. A hollow arrow shown in FIG. 10 (a) indicates a position where the center of the candidate points corresponds to position of a peak (Doppler velocity) and peak power of the weather echo spectrum.

Figure 11:
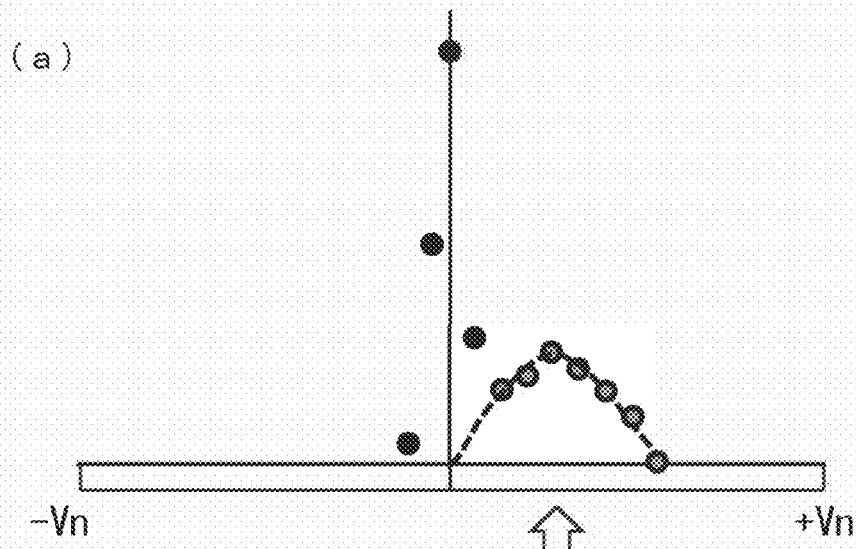
FIG. 11 is a schematic diagram showing relation between a topographic echo removed point and a target echo (weather echo) candidate point in the signal processing apparatus and the signal processing method according to the first embodiment of the present disclosure.
Figure 11:
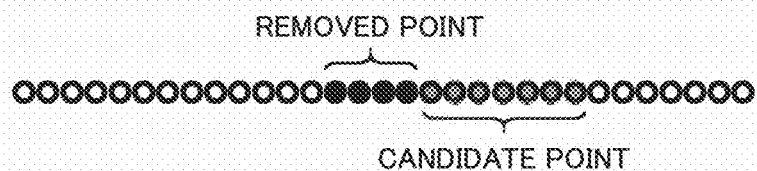

FIG. 11 shows an example in which candidate points are present only on one side of removed points as in FIG. 9, and in particular, the center of sample points consisting of combination of removed points and candidate points is located within the group of candidate points. In this case, unknown parameter $v_W$ of a weather echo spectrum may be located at a position of a maximum point of the candidate points and $S_W$ can also be considered as a value of that spectral point (the maximum point). A hollow arrow shown in FIG. 11 (a) indicates a position where the maximum point of the candidate points corresponds to a position of a peak (Doppler velocity) and peak power of the weather echo spectrum.

As a result of ST8, spectral width $\sigma_W$ can be set, for example, to a width between markings of sample points of a Doppler spectrum in parameter search of a weather echo spectrum in ST9 (ST103) and ST10 (ST104). A condition to quit parameter search of a weather echo spectrum in ST9 can be set, for example, to the number of times determined by setting of an upper limit of the number of times of search in advance or a square error of a candidate point and a point corresponding to a set weather echo spectrum attaining to the minimum. Finally, the removed points are interpolated with corresponding points of the weather echo spectrum found in ST9 (ST10).

Therefore, in the signal processing apparatus and the signal processing method according to the first embodiment, weather echo reconstruction unit 11 reconstructs a weather echo only when a point in a spectrum removed by topographic echo suppressor 8 and a point having electric power equal to or higher than a predetermined threshold value except for the point removed in the spectrum are adjacent in the direction of the frequency axis, which will be described in detail below.

In the signal processing apparatus and the signal processing method according to the first embodiment, in the case of such positional relation that a range of values of candidate points contains a range of values of removed points, unknown parameter $v_W$ of a weather echo spectrum is set in the center of the candidate points. Therefore, a searched space can be reduced and an amount (a time period) of calculation can be reduced. In other words, when there are removed points between the candidate points and the candidate points in the direction of the frequency axis, spectral parameter estimator 15 reconstructs a weather echo spectrum with an interpolation point having an unknown value being included, such that a midpoint in the entire series of candidate points and removed points sandwiched by the candidate points becomes a point having a maximum value of the weather echo spectrum (the interpolation point reconstruction step, in ST103).

In other words, weather echo clutter superimposition determination unit 13 (the positional relation determination step, ST102) determines that a range of values of points in a spectrum equal to or higher than predetermined electric power that remain after processing by topographic echo remover 10 contains a range of values of points in a spectrum removed by processing by topographic echo remover 10, weather echo reconstruction unit 11 (the interpolation point reconstruction step, ST103) reconstructs a weather echo such that the center of the points that remain in the spectrum equal to or higher than predetermined electric power is defined as a peak position of the weather echo spectrum.

When the candidate points are present on only one of the higher side and the lower side of the removed points, the signal processing apparatus and the signal processing method according to the first embodiment limit a range where unknown parameter $v_W$ of a weather echo spectrum is present to a range from the center of points consisting of combination of the removed points and the candidate points to the center in the range of values of the candidate points. Therefore, a searched space can be reduced and an amount (a time period) of calculation can be reduced. When a series of candidate points and a series of removed points are continuously present in the direction of the frequency axis, spectral parameter estimator 15 (the interpolation point reconstruction step, in ST103) reconstructs a weather echo spectrum with an interpolation point having an unknown value being included, such that a candidate point having a maximum value in the series of candidate points is set as a maximum value of the weather echo spectrum.

In other words, when weather echo clutter superimposition determination unit 13 (the positional relation determination step, ST102) determines that points in a spectrum equal to or higher than predetermined electric power that remain after processing by topographic echo remover 10 are present only in a region of a Doppler velocity higher or lower than points in a spectrum removed by processing by topographic echo remover 10, weather echo reconstruction unit 11 (the interpolation point reconstruction step, ST103) reconstructs a weather echo such that a section from the center on the Doppler velocity of the points in the spectrum equal to or higher than predetermined electric power that remain to the center of spectral points consisting of combination of the points in the spectrum removed by processing by topographic echo remover 10 and the points that remain in the spectrum equal to or higher than predetermined electric power is defined as a search range.

When a range of values of candidate points contains a range of values of removed points, and in particular, when the center of sample points consisting of combination of removed points and candidate points is located in a group of candidate points, the signal processing apparatus and the signal processing method according to the first embodiment set unknown parameter $v_W$ of a weather echo spectrum to the center of the sample points consisting of combination of the removed points and the candidate points and set $S_W$ to a value at that spectral point. Therefore, a searched space can be reduced and an amount (a time period) of calculation can be reduced. When there are removed points between the candidate points in the direction of the frequency axis and the midpoint of the entire series of the candidate points and the removed points sandwiched by the candidate points on the frequency axis corresponds to one of the candidate points, spectral parameter estimator 15 (the interpolation point reconstruction step, in ST103) reconstructs a weather echo spectrum with an interpolation point having an unknown value being included, such that the spectral point of the candidate point to be the midpoint is set as a point having the maximum value of the weather echo spectrum.

When weather echo clutter superimposition determination unit 13 (the positional relation determination step, ST102) determines that a range of values of points in a spectrum equal to or higher than predetermined electric power that remain after processing by topographic echo remover 10 contains a range of values of points in a spectrum removed by processing by topographic echo remover 10 and when the center of the points that remain in the spectrum equal to or higher than predetermined electric power is located outside the range of values of the removed points, weather echo reconstruction unit 11 (the interpolation point reconstruction step, ST103) reconstructs a weather echo such that a value of a point in the center of the points in the spectrum equal to or higher than predetermined electric power that remain after processing by topographic echo remover 10 is set as a peak of the weather echo spectrum.

When the candidate points are present only on one side of the removed points, and in particular, when the center of sample points consisting of combination of the removed points and the candidate points is located within the group of the candidate points, the signal processing apparatus and the signal processing method according to the first embodiment set unknown parameter $v_W$ of a weather echo spectrum to the position of the maximum point of the candidate points and set $S_W$ to a value at that spectral point (maximum point). Therefore, a searched space can be reduced and an amount (a time period) of calculation can be reduced. When the series of candidate points and the series of removed points are continuously present in the direction of the frequency axis and the midpoint of the entire series constituted of the series of candidate points and the series of removed points in the direction of the frequency axis corresponds to one of the candidate points, spectral parameter estimator 15 (the interpolation point reconstruction step, in ST103) reconstructs a weather echo spectrum with an interpolation point having an unknown value being included, such that the spectral point of the candidate point to be the midpoint is set as a point having the maximum value of the weather echo spectrum.

In other words, when weather echo clutter superimposition determination unit 13 (the positional relation determination step, ST102) determines that points in a spectrum equal to or higher than predetermined electric power that remain after processing by topographic echo remover 10 are present only in a region of a Doppler velocity higher or lower than the points in the spectrum removed by processing by topographic echo remover 10 and when the center of the points that remain in the spectrum equal to or higher than predetermined electric power is located outside the range of values of the removed points, a peak of a weather echo is present among remaining points and hence weather echo reconstruction unit 11 (the interpolation point reconstruction step, ST103) reconstructs the weather echo such that a value of a maximum point of the points in the spectrum equal to or higher than predetermined electric power that remain after processing by topographic echo remover 10 is set as a peak of the weather echo spectrum.

The signal processing apparatus and the signal processing method according to the first embodiment may use these operations (processing) by weather echo clutter superimposition determination unit 13 (the positional relation determination step, ST102) together. Depending on a condition for a candidate point and a removed point, an operation (processing) to reconstruct a weather echo spectrum may be selected. An operation (processing) by weather echo clutter superimposition determination unit 13 (the positional relation determination step, ST102) may be selected for each of a plurality of weather echoes obtained from reception signals obtained at the same timing.

As set forth above, the signal processing apparatus and the signal processing method according to the first embodiment extract an interpolation point by using a distance (positional relation) between removed points and candidate points in the direction of the frequency axis, and hence an amount (a time period) of calculation can be reduced. In other words, only when the removed points and the candidate points are adjacent to each other in the direction of the frequency axis, a spectral parameter is searched for. Therefore, an amount of calculation (a time period) of calculation can be smaller than in full search.

Furthermore, the signal processing apparatus and the signal processing method according to the first embodiment can extract an interpolation point. Therefore, a range searched for a parameter can be narrowed down based on phase relation in a Doppler spectrum of a topographic echo and a weather echo (target). Therefore, a topographic echo can be removed and a weather echo can be reconstructed with a small amount of calculation (at a high speed). In other words, the signal processing apparatus and the signal processing method according to the first embodiment can remove a topographic echo and reconstruct a weather echo (target echo).

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 transmitter; 2 transmission and reception switcher; 3 aerial wire portion (antenna portion, undulation emitter and accepter); 4 receiver; 5 signal processor; 6 display; 7 spectrum calculator; 8 topographic echo suppressor; 9 topographic echo estimator; 10 topographic echo remover; 11 weather echo reconstruction unit (target echo reconstruction unit); 12 weather echo candidate point extractor (candidate point extractor); 13 weather echo clutter superimposition determination unit (determination unit); 14 weather echo reproduction unit (target echo reproduction unit); 14a interpolation point extractor; 14b removed point processor; 15 spectral parameter estimator (target echo reconstruction unit)

The invention claimed is:

1. A signal processing apparatus configured to perform signal processing on a Doppler spectrum derived from a reception signal of a reflected wave of pulsed transmission waves repeatedly transmitted into a space, the signal processing apparatus comprising circuitry configured as:
  a topographic echo estimator to estimate a topographic echo from the Doppler spectrum;
  a candidate point extractor to extract a plurality of adjacent candidate points of a target echo, the target echo being obtained from the Doppler spectrum after removing the estimated topographic echo, a candidate point being a point where electric power is higher than a predetermined noise level;
  a determination unit to determine a relation between the positions of candidate points and a plurality of removed points of a spectrum of the topographic echo estimated by the topographic echo estimator and removed from the Doppler spectrum;
  an interpolation point extractor to extract as an interpolation point, a point where a spectrum of the target echo is missing by removal of the spectrum of the topographic echo, based on the relation between the positions of the candidate points and the removed points on a frequency axis; and a target echo reconstruction unit to reconstruct the spectrum of the target echo at a position of the interpolation point.

2. The signal processing apparatus according to claim 1, wherein when the removed points are present between the candidate points and the candidate points on the frequency axis, the target echo reconstruction unit reconstructs the spectrum of the target echo such that a midpoint in an entire series of the candidate points and the removed points sandwiched by the candidate points becomes a point having a maximum value of the spectrum of the target echo.

3. The signal processing apparatus according to claim 1, wherein when a series of the candidate points and a series of the removed points are adjacently present on the frequency axis, the target echo reconstruction unit reconstructs the spectrum of the target echo such that a candidate point having a maximum value in the series of the candidate points is set as a maximum value of the spectrum of the target echo.

4. The signal processing apparatus according to claim 1, wherein when the removed points are present between the candidate points on the frequency axis and a midpoint in an entire series of the candidate point and the removed points sandwiched by the candidate points on the frequency axis corresponds to one of the candidate points, the target echo reconstruction unit reconstructs the spectrum of the target echo such that a spectral point of a candidate point at the midpoint is set as a point having a maximum value of the spectrum of the target echo.

5. The signal processing apparatus according to claim 1, wherein when a series of the candidate points and a series of the removed points are adjacently present on the frequency axis and a midpoint in an entire series constituted of the series of the candidate points and the series of the removed points on the frequency axis corresponds to one of the candidate points, the target echo reconstruction unit reconstructs the spectrum of the target echo such that a spectral point of a candidate point at the midpoint is set as a point having a maximum value of the spectrum of the target echo.

6. The signal processing apparatus according to claim 1, wherein the candidate point extractor determines that there is no candidate point when the removed points and the candidate points are not adjacent on the frequency axis or when number of the candidate points that appear, does not change based on comparison between before and after increase in noise level of the Doppler spectrum.

7. The signal processing apparatus according to claim 6, further comprising circuitry configured as a removed point processor, wherein the removed point processor substitutes a level of the removed points with zero or a noise level of the Doppler spectrum when the candidate point extractor determines that there is no candidate point.

8. The signal processing apparatus according to claim 1, wherein the signal processing apparatus outputs at least one of the candidate points, the removed points, the interpolation point, and the reconstructed spectrum of the target echo.

9. The signal processing apparatus according to claim 1, wherein the spectrum of the target echo and the spectrum of the topographic echo are in a shape of an identical distribution function, and the distribution function is a Gaussian function and the target echo is a weather echo.

10. A signal processing method of performing signal processing on a Doppler spectrum derived from a reception signal of a reflected wave of pulsed transmission waves repeatedly transmitted into a space and resulting from removal of a topographic echo from a spectrum of a target echo and a spectrum of the topographic echo that are in a shape of an identical distribution function by using the distribution function, the signal processing method comprising:

a candidate point extraction step of extracting a plurality of adjacent candidate points of the spectrum of the target echo from the Doppler spectrum from which the spectrum of the topographic echo has been removed, a candidate point being a point where electric power is higher than a predetermined noise level;

a positional relation determination step of determining a relation between the positions of the candidate points and a plurality of removed points of the spectrum of the topographic echo removed from the Doppler spectrum;

an interpolation point extraction step of extracting as an interpolation point, a point where the spectrum of the target echo is missing by removal of the spectrum of the topographic echo based on the relation between the positions of the candidate points and the removed points on a frequency axis, and an interpolation point reconstruction step, wherein in the interpolation point reconstruction step, the spectrum of the target echo at a position of the interpolation point is reconstructed.

11. The signal processing method according to claim 10, further comprising a removed point processing step, wherein in the removed point processing step, a level of the removed points in a portion other than the reconstructed spectrum of the target echo is substituted with zero or a noise level of the Doppler spectrum.

12. The signal processing method according to claim 10, wherein in the interpolation point reconstruction step, when the removed points are present between the candidate points and the candidate points on the frequency axis, the spectrum of the target echo is reconstructed such that a midpoint in an entire series of the candidate points and the removed points sandwiched by the candidate points becomes a point having a maximum value of the spectrum of the target echo.

13. The signal processing method according to claim 10, wherein in the interpolation point reconstruction step, when a series of the candidate points and a series of the removed points are adjacently present on the frequency axis, the spectrum of the target echo is reconstructed such that a candidate point having a maximum value in the series of the candidate points is set as a maximum value of the spectrum of the target echo.

14. The signal processing method according to claim 10, wherein in the interpolation point reconstruction step, when the removed points are present between the candidate points on the frequency axis and a midpoint in an entire series of the candidate points and the removed points sandwiched by the candidate points on the frequency axis corresponds to one of the candidate points, the spectrum of the target echo is reconstructed such that a spectral point of a candidate point at the midpoint is set as a point having a maximum value of the spectrum of the target echo.

15. The signal processing method according to claim 10, wherein in the interpolation point reconstruction step, when a series of the candidate points and a series of the removed points are adjacently present on the frequency axis and a midpoint in an entire series constituted of the series of the candidate points and the series of the removed points on the frequency axis corresponds to one of the candidate points, the spectrum of the target echo is reconstructed such that a spectral point of a candidate point at the midpoint is set as a point having a maximum value of the spectrum of the target echo.

16. The signal processing method according to claim 10, wherein in the candidate point extraction step, a relation between the positions is determined based on an interval set in advance for a length on the frequency axis, and whether the removed points and the candidate points are adjacent is determined.

17. The signal processing method according to claim 16, wherein in the candidate point extraction step, when the removed points and the candidate points are not adjacent on the frequency axis, it is determined that there is no candidate point.

18. The signal processing method according to claim 10, wherein in the candidate point extraction step, when the candidate points are non-adjacent on the frequency axis judging with continuity set, in advance, on the frequency axis or when there are more candidate points than a number set in advance, the candidate points are extracted with a noise level of the Doppler spectrum being raised from the predetermined noise level.

19. The signal processing method according to claim 18, wherein in the candidate point extraction step, when a number of the candidate points that appear does not change based on comparison between before and after increase in noise level of the Doppler spectrum, it is determined that there is no candidate point.

20. The signal processing method according to claim 17, wherein in the candidate point extraction step, when it is determined that there is no candidate point, a level of the removed points is substituted with zero or the noise level of the Doppler spectrum.

21. The signal processing method according to claim 10, wherein the distribution function is a Gaussian function and the target echo is a weather echo.

22. The signal processing apparatus according to claim 1, wherein when the candidate points are non-adjacent on the frequency axis judging with continuity, set in advance, on the frequency axis or when there are more candidate points than a number set in advance, the candidate point extractor extracts a plurality of the candidate points with the noise level of the Doppler spectrum being raised from the predetermined noise level.

* * * * *